(12) United States Patent
Hori et al.

(10) Patent No.: US 6,283,567 B1
(45) Date of Patent: Sep. 4, 2001

(54) DRAWING METHOD FOR ELECTRONIC BLACKBOARD

(75) Inventors: Yasushi Hori; Masaki Hirano, both of Nagano (JP)

(73) Assignee: Nagano Japan Radio Co., Ltd., Nagano-Ken (JP)

( * ) Notice: Subject to any disclaimer, the term of this patent is extended or adjusted under 35 U.S.C. 154(b) by 0 days.

(21) Appl. No.: 09/496,263

(22) Filed: Feb. 1, 2000

(30) Foreign Application Priority Data

Feb. 2, 1999 (JP) .................................................. 11-027507

(51) Int. Cl.⁷ ........................................................ B41J 3/00
(52) U.S. Cl. .................................................. 347/2; 382/100
(58) Field of Search ........................... 347/2, 3; 358/472, 358/496; 382/100, 112, 113

(56) References Cited

FOREIGN PATENT DOCUMENTS

| 61068627 | * | 4/1986 | (JP) | .................................. | G06F/3/03 |
| 01263099 | * | 10/1989 | (JP) | .................................. | B43L/1/04 |
| 02127721 | * | 5/1990 | (JP) | .................................. | G06F/3/033 |
| 08065430 | * | 3/1996 | (JP) | .................................. | H04N/1/00 |
| 08065432 | * | 3/1996 | (JP) | .................................. | H04N/1/00 |
| 8156491 | | 6/1996 | (JP) | .................................. | B43L/1/04 |

* cited by examiner

*Primary Examiner*—John Barlow
*Assistant Examiner*—Julian D. Huffman
(74) *Attorney, Agent, or Firm*—Birch, Stewart, Kolasch & Birch, LLP

(57) ABSTRACT

In an electronic blackboard, a print head for drawing an image on the screen sheet is disposed on the upstream side of a read head for reading an image from the screen sheet, with respect to the forward travel direction of the screen sheet. When an image is printed on the screen sheet, the screen sheet is moved in the reverse travel direction. When the read head reads an image on the screen sheet, print stop processing is performed in order to stop printing operation of the print head. If an unerased image is present on the stored face of the screen sheet when printing on the screen sheet is performed, the unerased image on the stored face passes by the read head, because the screen sheet is moved in the reverse travel direction during such a printing operation. If the read head reads an unerased image, the print stop processing is performed in order to stop printing operation of the print head, and warning display processing is performed in order to display a message indicating that an unerased image is present on the screen sheet.

5 Claims, 4 Drawing Sheets

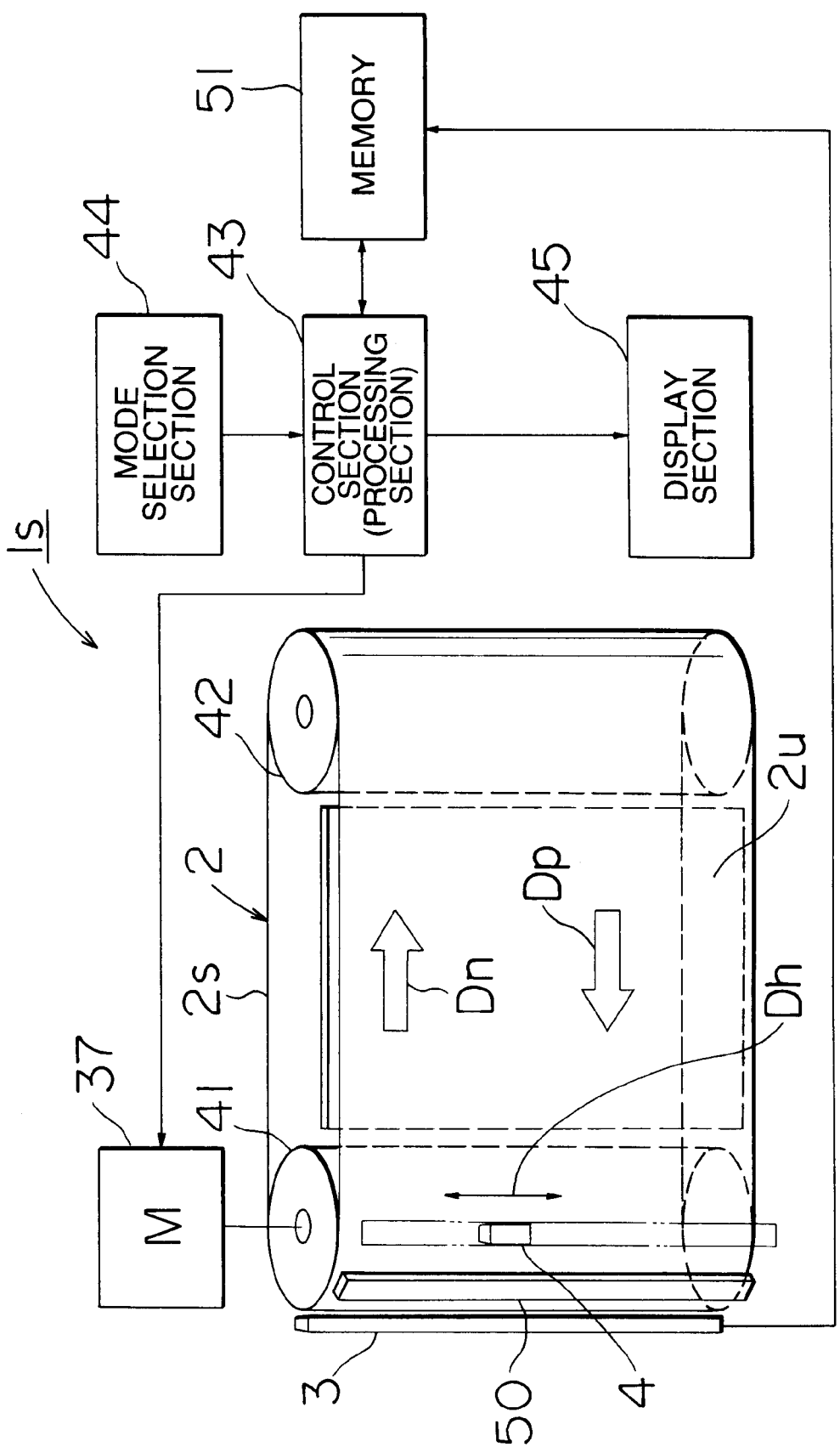

DRAWING METHOD FOR ELECTRONIC BLACKBOARD

BACKGROUND OF THE INVENTION

1. Field of the Invention

The present invention relates to a drawing method for an electronic blackboard having a copy function for copying an image from a screen sheet onto recording paper, as well as a drawing function for drawing on the screen sheet an image read from an original document.

2. Description of the Relevant Art

Conventionally, there has been known an electronic blackboard which has a drawing function for drawing (printing) on a screen sheet an image read from an original document, in addition to a copy function for copying and printing on recording paper an image read from the screen sheet.

In such an electronic blackboard, since an endless screen sheet extends between and is wound around a pair of separated transport rollers (drive and follower rollers), during use, only the front half of the screen sheet appears as an available face, and the remaining portion is concealed within a cabinet as a stored face. Therefore, when the drawing function is used in a state in which an image remains unerased on the stored face concealed within the cabinet, an image read from the original document is written over the unerased image on the screen sheet.

An electronic blackboard which can prevent such overwriting is proposed in Japanese Patent Application Laid-Open (kokai) No. 8 (1996)-156491. In the electronic blackboard disclosed in the publication, write means is disposed inside the blackboard to be located close to the screen sheet; image erasing means is disposed in the vicinity of and on the upstream side of the write means with respect to the travel direction of the screen sheet; and written images are erased immediately before writing operation is performed by the write means, to thereby prevent overwriting.

However, the above-described conventional electronic blackboard has a serious drawback in that even in the case where an image remaining unerased on the stored face of the screen sheet must remain unerased, the unerased image is automatically erased if a person who is unaware of the situation uses the drawing function. In order to solve such a drawback, there may be provided means for detecting an image remaining unerased on the stored face of the screen sheet. However, in this case, an additional mechanism is required. Resulting in increased complexity and increased cost.

SUMMARY OF THE INVENTION

An object of the present invention is to provide an electronic blackboard which prevents an image from being written over an unerased image, and which reliably eliminates the possibility of erroneous erasure of the unerased image.

Another object of the present invention is to provide a drawing method for an electronic blackboard which can be performed by use of the existing structure to thereby eliminate necessity of an additional mechanism and which can be performed with ease and at low cost.

Still another object of the present invention is to provide a drawing method for an electronic blackboard which enables drawing even when an image remains unerased on the screen sheet, to thereby allow an image to be drawn in regions other than the region in which the unerased image is present.

In order to achieve the above objects, the present invention provides a drawing method for an electronic blackboard having a copy function for copying an image from a screen sheet onto recording paper as well as a drawing function for drawing on the screen sheet an image read from an original document, wherein a print head for drawing an image on the screen sheet is disposed on the upstream side of a read head for reading an image from the screen sheet, with respect to the forward travel direction of the screen sheet; when an image is printed on the screen sheet, the screen sheet is moved in the reverse travel direction; and when the read head reads an image on the screen sheet, print stop processing is performed in order to stop printing operation of the print head.

If an unerased image is present on the stored face of the screen sheet when printing on the screen sheet is performed, the unerased image on the stored face passes by the read head, because the screen sheet is moved in the reverse travel direction during such a printing operation. If the read head reads an unerased image, the print stop processing is performed in order to stop printing operation of a print head, and warning display processing is performed in order to display a message indicating that an unerased image is present on the screen sheet.

BRIEF DESCRIPTION OF THE DRAWINGS

FIG. 5 is a functional block diagram showing the structure of a main portion of an electronic blackboard according to a modified embodiment.

DETAILED DESCRIPTION OF THE PREFERRED EMBODIMENTS

Embodiments of the present invention will next be described in detail with reference to the drawings. The accompanying drawings are illustrative of the embodiments and are not meant to limit the scope of the invention. In order to describe the invention clearly, detailed description of known parts is omitted.

First, the structure of an electronic blackboard 1, which can perform a drawing method according to an embodiment, will be described with reference to the drawings.

Figure 4:
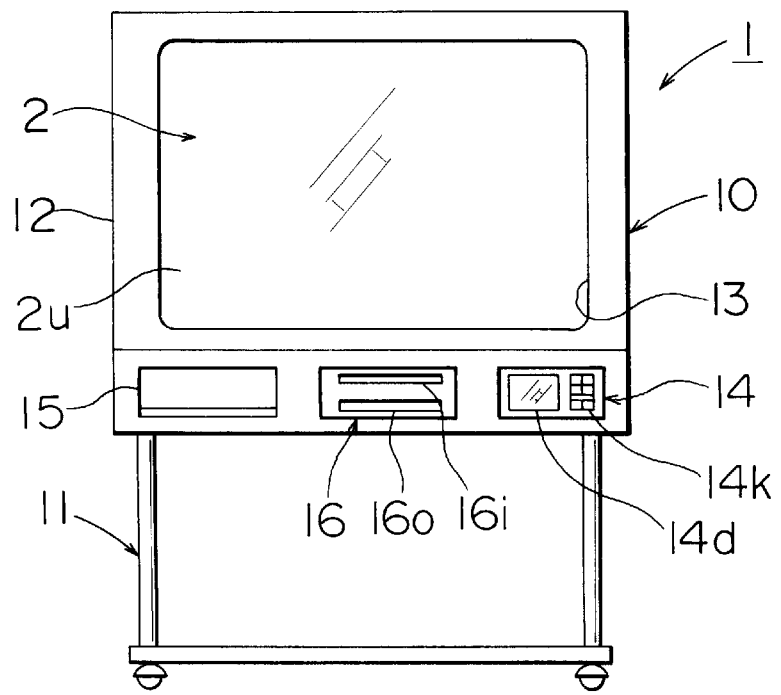
FIG. 4 is a front view showing the exterior appearance of the electronic blackboard which performs the drawing method.

FIG. 4 shows the exterior appearance of the electronic blackboard 1. The electronic blackboard 1 comprises a blackboard main-body portion 10 and a leg portion 11 supporting the blackboard main-body portion 10. The blackboard main-body portion 10 has a window portion 13 formed in the front face of a cabinet 12, and a screen sheet 2 is exposed from the window portion 13. At a lower portion of the cabinet 12 are provided an operation panel 14 having a keyboard 14k and a display 14d; a paper outlet 15 from which a printed sheet of recording paper is discharged; and an original document reading portion 16 having an original document insertion inlet 16i and an original document discharge outlet 16o.

Figure 2:
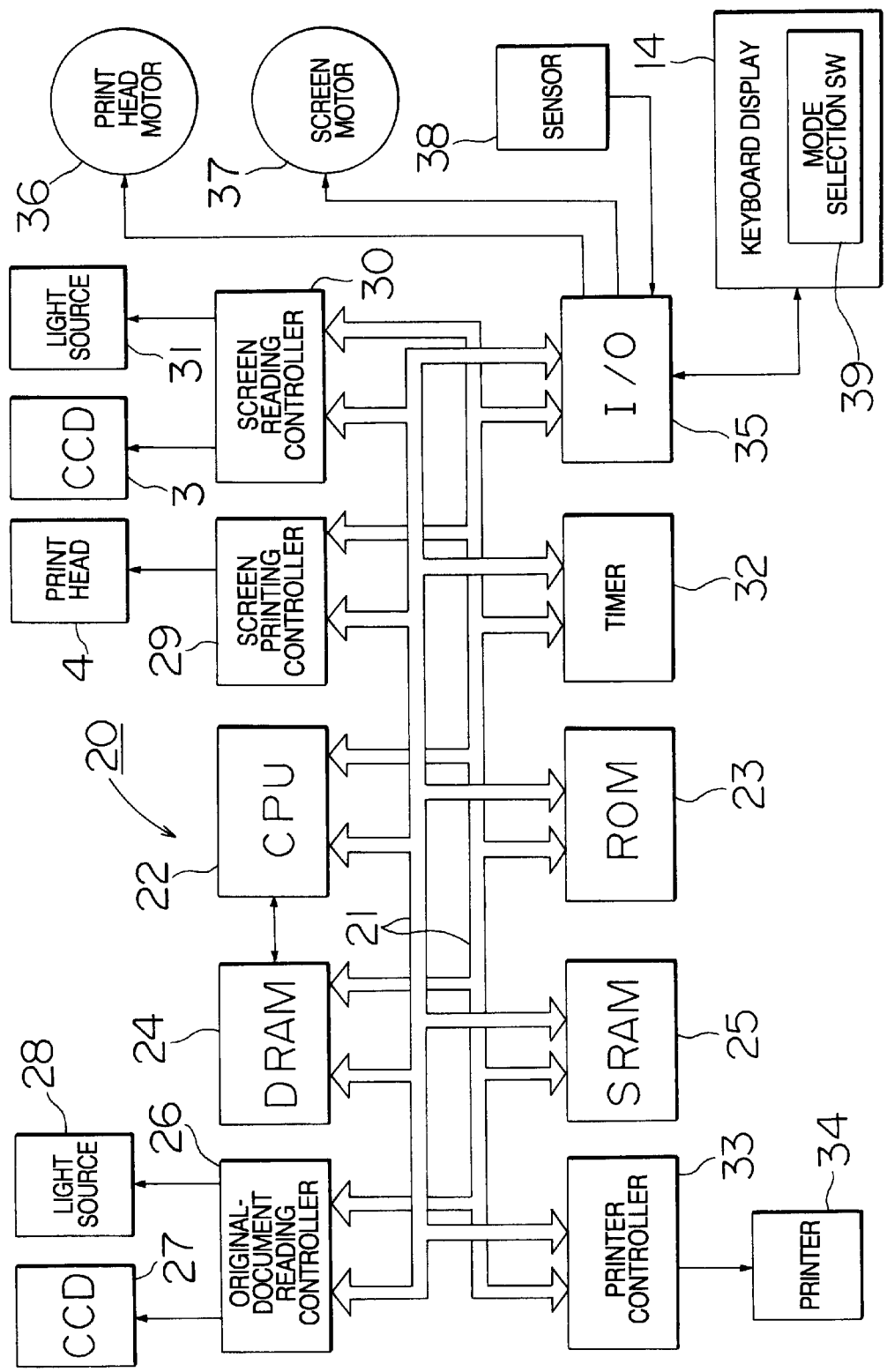
FIG. 2 is a block diagram showing the hardware configuration of the electronic blackboard which performs the drawing method.

Next, the internal configuration of the electronic blackboard 1 will be described with reference to FIGS. 2 and 3. FIG. 2 shows the entire hardware configuration of the electronic blackboard 1. In FIG. 2, reference numeral 20 denotes a main portion of a computer (hereinafter referred to as a "computer main portion") which is connected to a bus line 21 and includes a CPU (central processing unit) 22, ROM 23 storing a program, DRAM (dynamic RAM) 24 for temporarily storing data, and SRAM (static RAM) 25 for storing preset various operating conditions. Further, a light source 28 for illuminating an original document and an original document read head 27 utilizing CCDs are connected to the bus lines 21 via an original-document reading controller 26; a print head 4 of, for example, an ink jet scheme for printing images on the screen sheet 2 is connected to the bus lines 21 via a screen printing controller 29; and a light source 31 for illuminating the screen sheet and a read head 3 utilizing CCDs and adapted to read images from the screen sheet 2 are connected to the bus line 21 via a screen reading controller 30. Also, a timer 32 is connected to the bus line 21; and a printer 34 is connected to the bus line 21 via a printer controller 33. Moreover, a print head motor 36, a screen motor 37, various sensors 38, and the above-described operation panel 14 are connected to the bus line 21 via an interface 35. The print head motor 36 reciprocates the print head 4 along a sub-scan direction Dh perpendicular to the travel direction of the screen sheet 2. The screen motor 37 moves the screen sheet 2 in a forward direction Dp and in a reverse direction Dn (see FIG. 3). When the screen sheet 2 is moved in the reverse direction Dn, the screen sheet 2 is intermittently moved in increments of a single line through control of the screen motor 37. During printing, the print head 4 is caused to perform printing one line at a time. In addition to the above-described keyboard 14k and the display 14d, the operation panel 14 includes a mode selection switch 39.

Figure 3:
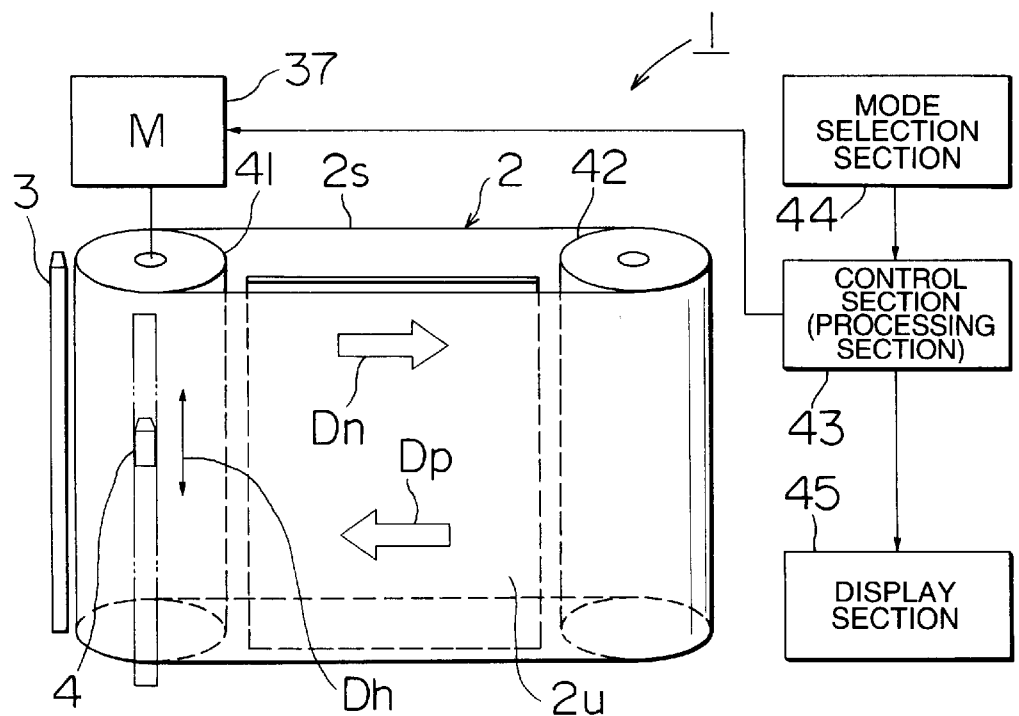
FIG. 3 is a functional block diagram showing the structure of a main portion of the electronic blackboard which performs the drawing method.

FIG. 3 shows the structure of the internal mechanism of the electronic blackboard 1 and also shows, in the form of a functional block diagram, the structure of a main portion that performs the drawing method of the present embodiment. The screen sheet 2 is formed in an endless shape, and extends between and is wound around a pair of separated transport rollers; i.e., a drive roller 41 and a follower roller 42. Therefore, only the front half of the screen sheet 2 appears, as an available face 2u, at the window portion 13 of the cabinet 12 shown in FIG. 4, and the remaining portion is concealed within the cabinet 12 as a stored face 2s. The drive roller 41 is rotated by the screen motor 37, which is controlled by a control section (processing section) 43. A mode selection command is fed from a mode selection section 44 to the control section 43, and a display signal is supplied from the control section 43 to a display section 45. The control section 43 includes the computer main portion 20; the mode selection section 44 includes the mode selection switch 39; and the display section 45 includes the display 14d.

The mode selection section 44 (mode selection switch 39) allows a user to select an ordinary normal mode or an overwrite prevention mode in which the drawing method according to the present invention (embodiment) is performed. When the normal mode is selected, the user is allowed to intentionally perform overwriting; for example, to additionally print sentences on the lower half of the screen sheet 2, on the upper half of which sentences have been written, and to perform printing while canceling the reading of ruled lines which have been printed in advance on the screen sheet by use of erasable paint. Further, during warning display processing, which will be described later, the display section 45 (display 14d) displays a message informing the user that an unerased image is present on the screen sheet 2.

The read head 3 is disposed outside the circumferential surface of the drive roller 41 such that the read head 3 faces the screen sheet 2 and extends along the vertical direction (widthwise direction). The print head 4 is disposed on the upstream side of the read head 3 with respect to the travel direction (forward direction Dp) of the screen sheet 2. Through operation of the print head motor 36, the print head 4 is reciprocated along the sub-scan direction Dh perpendicular to the travel direction of the screen sheet 2 in order to perform printing in increments of one line.

In the above-described manner, the electronic blackboard 1 is constituted to have a copy function for copying on recording paper an image read from the screen sheet 2, and a drawing function for drawing on the screen sheet 2 an image read from an original document. When the copy function is used, the screen sheet 2 is continuously moved in the forward direction Dp; images on the available face 2u are read by the read head 3; and image data are printed out from the printer 34.

Figure 1:
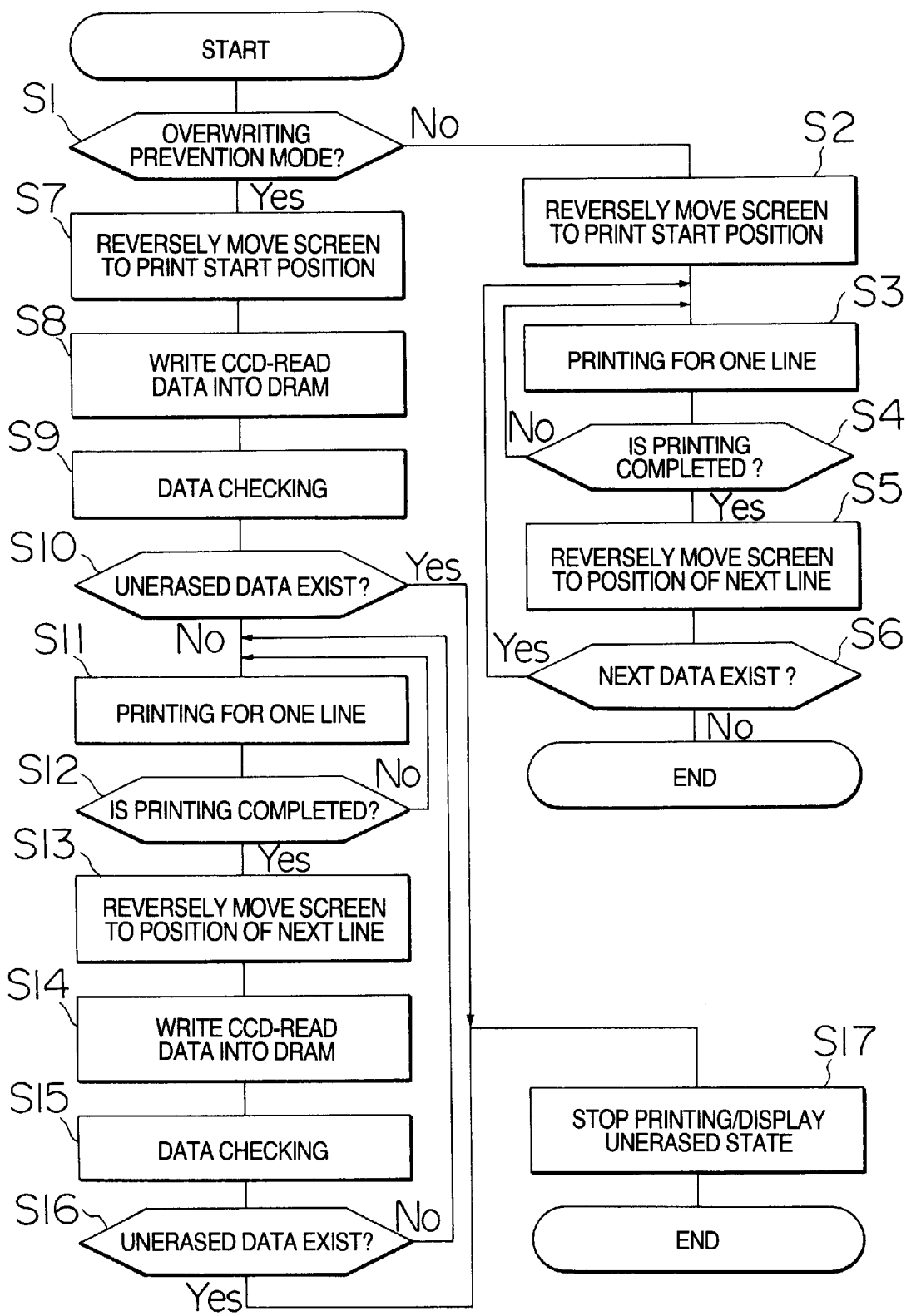
FIG. 1 is a flowchart showing the steps of a drawing method for an electronic blackboard according to a preferred embodiment of the present invention.

Next, the drawing method of the electronic blackboard 1 according to the embodiment will be described with reference to the flowchart shown in FIG. 1.

When the normal mode is selected by use of the mode selection section 44 (mode selection switch 39) (step S1), printing process is performed, regardless of whether or not images (unerased images) are present on the stored face 2s of the screen sheet 2. In this case, first, the screen motor 37 is controlled by the control section 43 (computer main portion 20) such that the screen sheet 2 is moved in the reverse direction (main scan direction) Dn and is stopped at an initial print start position (step S2). Subsequently, the print head motor 36 is controlled by the control section 43 such that the print head 4 reciprocates once along the subscan direction Dh, and during forward movement, the print head 4 prints image segments for one line (step S3). After completion of printing, the screen sheet 2 is moved in the reverse direction Dn by a distance corresponding to the line pitch. If a next print data set is present, printing for one line is performed in a similar manner (steps S4, S5, S6, and S3). The above-described print process—in which the screen sheet 2 is intermittently moved in increments of the distance corresponding to the line pitch and printing is performed for each line—is repeated for all print data.

When the overwriting prevention mode is selected by use of the mode selection section 44 (step S1), the following process is performed. First, the screen motor 37 is controlled by the control section 43 such that the screen sheet 2 is moved in the reverse direction Dn and is stopped at an initial print start position (step S7). In this case, if the screen sheet 2 is moved by a distance corresponding to the distance between the print head 4 and the read head 3, it becomes possible to avoid overwriting of an image on an unerased image(s) present in a region between the print head 4 and the read head 3. When the screen sheet 2 is moved, the read head 3 reads an image(s) from the screen sheet 2. Data (binary data) obtained through the read operation are temporarily stored in the DRAM 24 and checked by the control section (processing section) 43 (steps S8 and S9). When the result of the data check indicates that no unerased image (unerased data) is present, the print head motor 36 is controlled by the control section 43 such that the print head 4 prints image segments for one line (steps S10 and S11). After completion of printing, the screen sheet 2 is moved in the reverse direction Dn by a distance corresponding to the line pitch (steps S12 and S13).

When the result of the data check in step S8 indicates that unerased data are present, the control section 43 performs print stop processing and warning display processing (step S17). During the print stop processing, the control section 43 stops the operations of the screen motor 37 and the print head motor 36, as well as the print operation of the print head 4. During the warning display processing, the fact that unerased images are present on the screen sheet 2 is displayed. More specifically, a display signal is fed from the control section 43 to the display section 45 (display 14d), and a message indicating that unerased images are present on the screen sheet 2 is displayed on the display 14d by use of characters, symbols, or the like. Warning may be provided by use of an alarm lamp or auditory means such as a chime. When an unerased image is present, the image may be copied on recording paper by use of the copy function and then erased, and then the drawing function may be used again.

When the screen sheet 2 is moved in step S13, the read head 3 reads an image(s) from the screen sheet 2. Data (binary data) obtained through the read operation are temporarily stored in the DRAM 24 and checked by the control section (processing section) 43 (steps S14 and S15). When the result of the data check indicates that no unerased image (unerased data) is present, the print head motor 36 is controlled by the control section 43 such that the print head 4 prints image segments for one line (steps S16 and S11). After completion of printing, the screen sheet 2 is moved in the reverse direction Dn by a distance corresponding to the line pitch (steps S12 and S13). When the result of the data check in step S15 indicates that unerased data are present, the control section 43 performs print stop processing and warning display processing (step S17).

In the drawing method according to the present invention, when no unerased image is present on the screen sheet 2, the print process—in which the screen sheet 2 is intermittently moved in increments of a distance corresponding to the line pitch, and printing for one line is performed—is repeated for all the print data. However, when an unerased image present at a certain position is detected, there is performed print stop processing, which includes warning display processing for displaying that an unerased image(s) is present. Therefore, overwriting of an image on an unerased image is prevented, and the possibility of the unerased image being erroneously erased is eliminated reliably. Especially, since the screen sheet 2 is intermittently moved in increments of a distance corresponding to the line pitch, and the print head 4 performs printing on a line-by-line basis, the print stop processing and the warning display processing are performed on a line-by-line basis. Therefore, drawing can be performed properly in regions of the screen sheet 2 other than regions in which unerased images are present. Since the drawing method of the present invention can be performed by use of the existing structure, an additional mechanism is not required, and the drawing method can be performed with ease and at low cost.

Next, a drawing method for an electronic blackboard 1s according to a modified embodiment will be described with reference to FIG. 5. In the modified embodiment, an erase head 50 is disposed between the read head 3 and the print head 4 in order to automatically erase an unerased image(s) on the screen sheet 2, and a temporary memory 51 is added. When the screen sheet 2 is moved in the forward direction Dp, the read head 3 always performs reading operation, and data of images on at least the entirety of an available face 2u just used are written in the temporary memory 51 for back-up purpose.

When printing is performed for the screen sheet 2, the screen sheet 2 is moved in the reverse direction Dn. During such movement, the erase head 50 automatically erases an unerased image(s), and the print head 4 performs printing on the screen sheet 2. In this case, the print process is continued until the print process is performed for all the print data. Also, the control section 43 performs the warning display processing. That is, a message indicating that unerased images were present on the screen sheet 2 is displayed on the display section 45 (display 14d) by use of characters, symbols, or the like. This enables a user to print out unerased data which have been stored in the temporary memory 51 as back-up data, or to reproduce the erased images on the screen sheet 2 by use of the print function. Therefore, overwriting of an image on an unerased image is prevented, and the possibility of the unerased image being erroneously erased is eliminated reliably. In FIG. 5, the same portions as those in FIG. 3 are denoted by the same reference numerals, and their detailed descriptions are omitted.

While the present invention has been described with reference to the preferred embodiments, the present invention is not limited thereto. Regarding structural details, shapes, materials, the numbers of elements, among others, modifications and any omission or addition may be possible as needed without departing from the scope of the invention. For example, the above-described embodiments employ the scheme such that the screen sheet 2 is intermittently moved in increments of a distance corresponding to the line pitch, and the print head 4 performs printing on a line-by-line basis. However, the present invention is not limited to such a scheme. Further, in the modified embodiment shown in FIG. 5, the erase head 50 may be disposed on the follower roller 42 side, and, during printing, the screen sheet 2 may be moved in the forward direction Dp.

What is claimed is:

1. A drawing method for an electronic blackboard having a copy function for copying an image from a screen sheet onto recording paper as well as a drawing function for drawing on the screen sheet an image read from an original document, the method comprising:

disposing a print head for drawing an image on the screen sheet on the upstream side of a read head for reading an image from the screen sheet, with respect to a forward travel direction of the screen sheet;

moving the screen sheet in a reverse travel direction when an image is printed on the screen sheet; and performing print stop processing in order to stop printing operation of the print head when the read head reads an image on the screen sheet.

2. A drawing method for an electronic blackboard according to claim 1, wherein the print stop processing comprises warning display processing for displaying a message indicating that an unerased image is present on the screen sheet.

3. A drawing method for an electronic blackboard according to claim 1, wherein the screen sheet is intermittently moved in increments of a distance corresponding to the line pitch, and the print head performs printing on a line-by-line basis.

4. A drawing method for an electronic blackboard according to claim 3, wherein when the screen sheet is moved, the read head is caused to read an image from the screen sheet; data obtained through the read operation are temporarily stored in a memory and checked by a control section; and when no unerased image is present, the print head is caused to print an image segment for one line.

5. A drawing method for an electronic blackboard according to claim 1, wherein before start of printing, the screen sheet is moved in the reverse travel direction by a distance corresponding to the distance between the print head and the read head, so that the screen sheet is stopped at an initial print start position.

* * * * *